(12) United States Patent
Jang

(10) Patent No.: US 6,201,911 B1
(45) Date of Patent: Mar. 13, 2001

(54) APPARATUS FOR MANUFACTURING LONG-PERIOD FIBER GRATINGS AND APPARATUS FOR MANUFACTURING TWO-BAND LONG-PERIOD FIBER GRATINGS USING THE SAME

(75) Inventor: Joo-nyung Jang, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/377,184

(22) Filed: Aug. 19, 1999

(30) Foreign Application Priority Data

Aug. 19, 1998 (KR) .................................................. 98 33626
Jun. 21, 1999 (KR) .................................................. 99 23276

(51) Int. Cl.$^7$ ........................................................ G02B 6/34
(52) U.S. Cl. ................................ 385/37; 385/33; 385/34; 385/11; 430/290
(58) Field of Search .................................. 385/37, 11, 33, 385/12, 34, 16, 10, 129, 123; 359/248; 372/20, 50, 6, 108; 430/5, 290, 321; 436/172

(56) References Cited

U.S. PATENT DOCUMENTS 6,038,358 * 3/2000 Nishiki .................................... 385/37
6,130,973 * 3/2000 Lauzon et al. ......................... 385/37

* cited by examiner

Primary Examiner—Phan T. H. Palmer
(74) Attorney, Agent, or Firm—Robert E. Bushnell, Esq.

(57) ABSTRACT

An apparatus for manufacturing a long-period fiber grating and a two-band long-period fiber grating manufacturing apparatus using the same are provided. The apparatus includes a light source for generating the UV laser light, a mirror for reflecting the UV laser light generated in the light source at a predetermined angle and changing the traveling path thereof, a lens for focusing the laser light whose traveling path is changed by the mirror, a dispersing unit for dispersing the laser light passed through the lens, and an amplitude mask positioned between the dispersing unit and the optical fiber, and having a transmission region in which the dispersed laser light is periodically transmitted to the optical fiber. The bandwidth of a long-period fiber grating can be adjusted by adjusting the size of a laser beam irradiated into an optical fiber. Also, amplitude masks can be easily manufactured at low cost and damage threshold power thereof is high.

31 Claims, 8 Drawing Sheets

APPARATUS FOR MANUFACTURING LONG-PERIOD FIBER GRATINGS AND APPARATUS FOR MANUFACTURING TWO-BAND LONG-PERIOD FIBER GRATINGS USING THE SAME

CLAIM OF PRIORITY

This application makes reference to, incorporates the same herein, and claims all benefits accruing under 35 U.S.C. §119 from an application for APPARATUS FOR MANUFACTURING LONG-PERIOD GRATING FILTERS earlier filed in the Korean Industrial Property Office on Aug. 19, 1998 and there duly assigned Serial No. 33626/1998, and an application for APPARATUS FOR MANUFACTURING TWO-BAND LONG-PERIOD GRATINGS, earlier filed in the Korean Industrial Property Office on Jun. 21, 1999 and there duly assigned Serial No. 23276/1999.

BACKGROUND OF THE INVENTION

1. Field of the Invention

The present invention relates to an apparatus for manufacturing long-period fiber gratings, and to an apparatus for manufacturing two-band long-period fiber gratings.

2. Description of the Related Art

A long-period fiber grating couples a fundamental core mode of an optical fiber to the cladding lead modes. This type of fiber grating has an advantage over the reflection type of grating of flattening the gain of a fiber amplifier.

Long-period fiber gratings are typically manufactured by periodically varying along an optical fiber the refractive index of a UV-sensitive core of the optical fiber by exposure to UV rays. In other words, the portion of the optical fiber core exposed to UV rays exhibits an increase in the refractive index and the non-exposed portion exhibits no change in the refractive index, so that a periodic change in the refractive index occurs. Coupling will occur in the core of an optical fiber under the condition expressed in Equation (1):

$$\beta_{co} - \beta_{cl}^n = \frac{2\pi}{\Lambda} \quad (1)$$

where $\beta_{co}$ is the propagation constant of a core mode, $\beta_{cl}^n$ is the propagation constant of a cladding mode and $\Lambda$ is the grating period of the optical fiber.

When $\beta$ is substituted with $$2\pi \frac{n}{\lambda},$$

where, n is the effective refractive index, Equation (1) can be rewritten stating that the difference between refractive indices of the core mode and the cladding mode, $(n_{co} - n_{cln})$, is equal to $$\frac{\lambda}{\Lambda}.$$

Therefore, coupling wavelength $\lambda$ depends on the grating period $\Lambda$ and the refractive index difference $n_{co} - n_{cl}^n$. For a fixed grating period $\Lambda$, coupling wavelength $\lambda$ changes with $n_{co} - n_{cl}^n$, the refractive index difference which can be obtained by appropriately irradiating UV laser into the optical fiber which is sensitive to UV rays.

If a CV laser irradiates a photosensitive optical fiber, the refractive index of the core of the optical fiber increases and as a result, the coupling occurs at a longer wavelength. A long-period fiber grating is manufactured by focusing UV laser such as an excimer laser in the x- or y-axis using a cylindrical lens and irradiating the same into a photosensitive optical fiber through an amplitude mask having a periodicity $\Lambda$. In the case of an excimer laser with a 10×30 mm beam size, the beam is largest when it is focused to a rectangular axis of 30 mm long excimer laser. That is, in this case, the maximum length of the beam along one axis is 30 mm.

Here, it is important for the amplitude mask to have an accurate periodicity. In order to attain an accurate periodicity of the amplitude mask, various methods are employed. One of them is a method in which a single slit or optical fiber is installed in a translation stage and is then shifted by a desired period between steps of irradiating laser light thereon. The single slit method has advantages in that the periodicity of the slit is accurate and arbitrarily adjusted. However, according to this method, since the width of the slit is fixed, the duty cycle, which is a ratio of a transmitted domain of light and a non-transmitted domain of light, is not constant when the period of a long-period fiber grating is changed. Also, since the refractive index change is obtained point by point using a slit, much time is required and much of the beam of laser light cannot be effectively utilized. Further, in order to accurately design a desired filter spectrum, it is necessary to know the precise change in refractive index achieved per pulse. Moreover, an expensive translation stage is necessary.

Alternatively, in order to make the periodicity of a mask accurate, the mask can be manufactured by patterning with chrome on silica. However, according to this method, the mask manufacturing process is complicated and costly. Also, since the period of the mask is fixed, only a single spectrum can be created using a particular mask. Further, in this case, since the damage threshold power for this type of mask is low, the high power of an excimer laser cannot be effectively used.

Another method is to use multiple slits. The process for preparing a mask is simple and the costs therefor are low. However, since an error of one mask periodicity caused during laser treatment is very large, that is, ±5 μm, an accurate spectrum design cannot be achieved easily. Also, since the period is fixed, the spectrums which can be designed are limited.

In general, the gain curve of an erbium-doped fiber amplifier (EDFA) can be flattened when two or three different long-period fiber gratings are used, which means two or three different mask periods are necessary. Because the gain curve depends on the input signal light power, pump power, rare earth dopant rate, glass matrix, fiber length and so on, as many mask periods as possible are necessary.

SUMMARY OF THE INVENTION

It is therefore an object of the present invention to provide an improved apparatus for manufacturing a long-period optical fiber grating.

It is a further object to provide an apparatus for manufacturing a long-period optical fiber grating which does not have the non-constant duty cycle problems of the single slit method.

It is a yet further object to provide an apparatus which requires less time than the single slit method.

It is a still further object to provide an apparatus which takes advantage of the more of the laser beam.

It is a still yet further object to provide an apparatus which does not require an expensive translation stage.

It is an additional object of the invention to provide an apparatus which does not require a separate mask for each spectrum.

It is still an additional object of the invention to provide an apparatus which allows use of iS a high power excimer laser.

It is also an object of the present invention to provide an improved apparatus for manufacturing a two-band long-period optical fiber grating.

It is still another object of the present invention to provide an apparatus for manufacturing a two-band long-period optical fiber grating which avoids problems associated with sequential manufacture of the two bands.

To achieve the above objects, the present invention provides an apparatus for manufacturing long-period fiber gratings for adjusting the periods of gratings written on an optical fiber by providing a concave lens for dispersing incident light and an amplitude mask having a predetermined period and changing the position of the amplitude mask, and an apparatus for manufacturing two-band long-period fiber gratings using the same.

Accordingly, to achieve the objectives, there is provided an apparatus for manufacturing a long-period fiber grating for periodically varying the refractive index of a core of an optical fiber by periodically irradiating UV laser light into the optical fiber, the apparatus including a light source for generating the UV laser light, a mirror for reflecting the UV laser light generated in the light source at a predetermined angle and changing the traveling path thereof, a lens for focusing the laser light whose traveling path is changed by the mirror, a dispersing unit for dispersing the laser light passed through the lens, and an amplitude mask positioned between the dispersing unit and the optical fiber, and having a transmission region in which the dispersed laser light is periodically transmitted to the optical fiber.

According to another aspect of the present invention, there is provided an apparatus for manufacturing a long-period fiber grating for periodically varying the refractive index of a core of an optical fiber by periodically irradiating UV laser light into the optical fiber, the apparatus including a light source for generating the UV laser light, a mirror for reflecting the UV laser light generated in the light source at a predetermined angle and changing the traveling path thereof, a lens for focusing the laser light whose traveling path is changed by the mirror, a dispersing unit for dispersing the laser light passed through the lens, and an amplitude mask positioned between the dispersing unit and the optical fiber, and having a transmission region in which the dispersed laser light is periodically transmitted to the optical fiber, a measuring unit for measuring coupling peaks of a long-period fiber grating written on the optical fiber, and a controller for adjusting the position of the amplitude mask for obtaining a desired coupling peak wavelength in accordance with the coupling peak wavelengths measured by the measuring unit.

According to still another aspect of the present invention, there is provided an apparatus for manufacturing a two-band long-period fiber grating having different periods by aligning first and second amplitude masks having periodically repeated transmission regions and located at different positions from each other in the length direction of an optical fiber, in which UV laser light is irradiated into the two amplitude masks, the apparatus including a first long-period fiber grating manufacturing unit for determining the period of a first long-period fiber grating to be written on the optical fiber by adjusting the distance between the first amplitude mask and the optical fiber, and writing the first long-period fiber grating having a predetermined period on the optical fiber, a second long-period fiber grating manufacturing unit for determining the period of a second long-period fiber grating to be written on the optical fiber by adjusting the distance between the second amplitude mask and the optical fiber, and writing, the second long-period fiber grating having a predetermined period on the optical fiber, wherein the first and second long-period grating manufacturing units substantially simultaneously manufacturing the first and second long-period gratings, a light source, a measuring unit for measuring the output spectrum of the light generated in the light source and passed through the optical fiber on which the first and second long-period fiber gratings, and a controller for checking the output spectrum measured by the measuring unit and adjusting the positions of the first and second amplitude masks to obtain a desired output spectrum.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 7A and 7B illustrate changes in wavelengths where coupling occurs over the keeping time, in which FIG. 7A illustrates a change in wavelengths where coupling occurs over UV exposure time and FIG. 7B illustrates a change in wavelength where coupling starts over the keeping time after $H_2$ loading.

DESCRIPTION OF THE PREFERRED EMBODIMENTS

Figure 1:
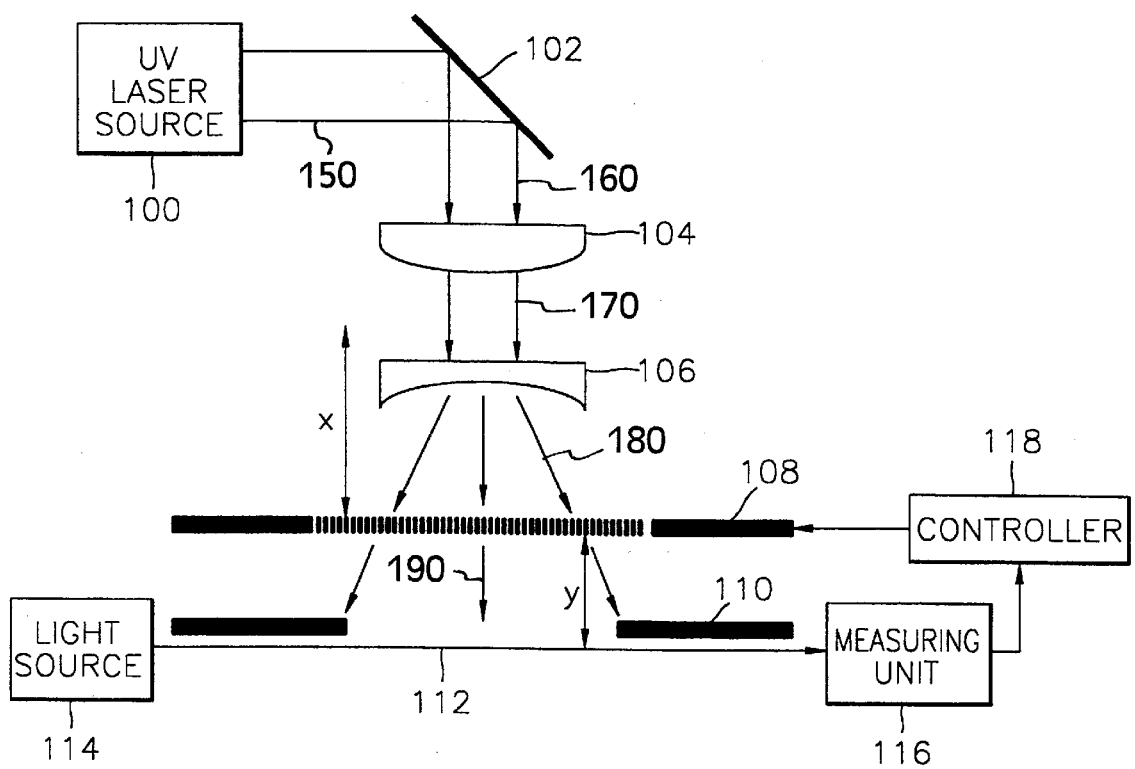
FIG. 1 is a schematic diagram of an apparatus for manufacturing long-period fiber gratings according to the present invention.

The apparatus shown in FIG. 1 includes a UV laser source 100, a mirror 102 for changing the path of UV laser light generated from the UV laser source 100, a cylindrical lens 104 for focusing the laser light whose path is changed by the mirror 102, a dispersion unit 106 for dispersing laser light focused by the cylindrical lens 104, an amplitude mask 108 for selectively passing the light having passed through the dispersion unit 106, a slit 110 for allowing the laser light passed through the amplitude mask 108 to be irradiated only onto the portion where a long-period fiber gratings can be formed in an optical fiber 112, a light source 114, a measuring unit 116 for measuring the characteristics of the light passed through the optical fiber 112, and a controller 118 for determining the position of the amplitude mask 108 depending on coupling peaks and coupling peak wavelengths measured by the measuring unit 116.

The apparatus having the aforementioned configuration operates as follows. The mirror 102 reflects the laser light 150 generated in the UV laser source 100 by a predetermined angle to change the traveling path of the laser light. Mirror 102 is not strictly required, and the apparatus may be constructed with TV laser source 100 aimed directly at cylindrical lens 104. The cylindrical lens 104 converges the reflected laser light 160 onto an axis to be focused on the optical fiber 112. The dispersion unit 106 disperses the laser light 170 passed through the cylindrical lens 104. A concave lens, that is a lens with a concave face, such as a plano-concave lens, may be used as the dispersion ii unit 106.

The amplitude mask 108 selectively transmits the light passed through the dispersion unit 106. The width of the slit 110 is determined depending on the band width of the spectrum of the long-period fiber grating. If the light 190 passed through the slit 110 is irradiated into the optical fiber 112, the refractive index of a portion selectively exposed to the light in the core is changed. The measuring unit 116 measures the coupling peaks of wavelengths of the light generated from the light source 114 and passed through the optical fiber 112.

The controller 118 controls the period of the long-period fiber grating by adjusting the position of the amplitude mask 108 so that coupling occurs at a desired wavelength among wavelengths which pass through the long-period fiber grating formed by the above-described process.

Figure 2:
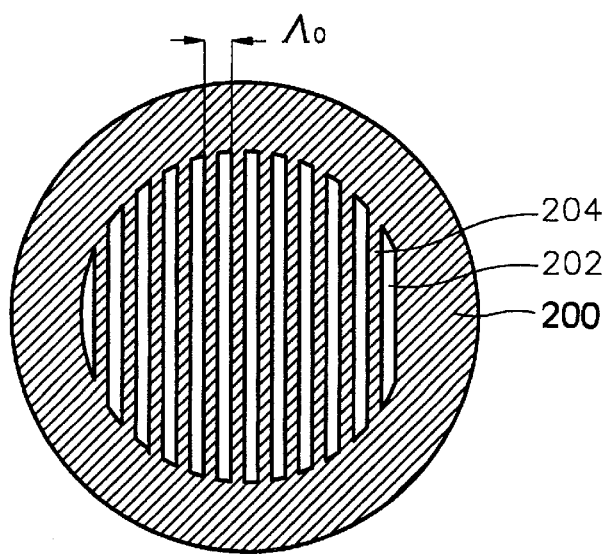
FIG. 2 illustrates an embodiment of an amplitude mask shown in FIG. 1.

FIG. 2 illustrates an embodiment of an amplitude mask 108 shown in FIG. 1. The amplitude mask shown in FIG. 2 is formed on a thin metal substrate 200 having a thickness of about 0.2 mm, e.g., a stainless steel substrate, to have a transmission region 202 in which the light is transmitted with a periodicity $\Lambda_0$ of several hundred micrometers and a non-transmission region 204. The transmission region 202 is formed by $CO_2$ laser technology or chemical etching. Unlike a typical chrome-patterned silica mask, a metal mask can tolerate the power of an excimer laser. Since the metal substrate 200 raises the damage threshold of the amplitude mask, a high-power UV laser can be used as a source. The laser passes through the transmission region 202 so that the refractive index of an optical waveguide increases. The non-transmission region 204 which is made of a metal blocks the UV laser light.

Figure 3:
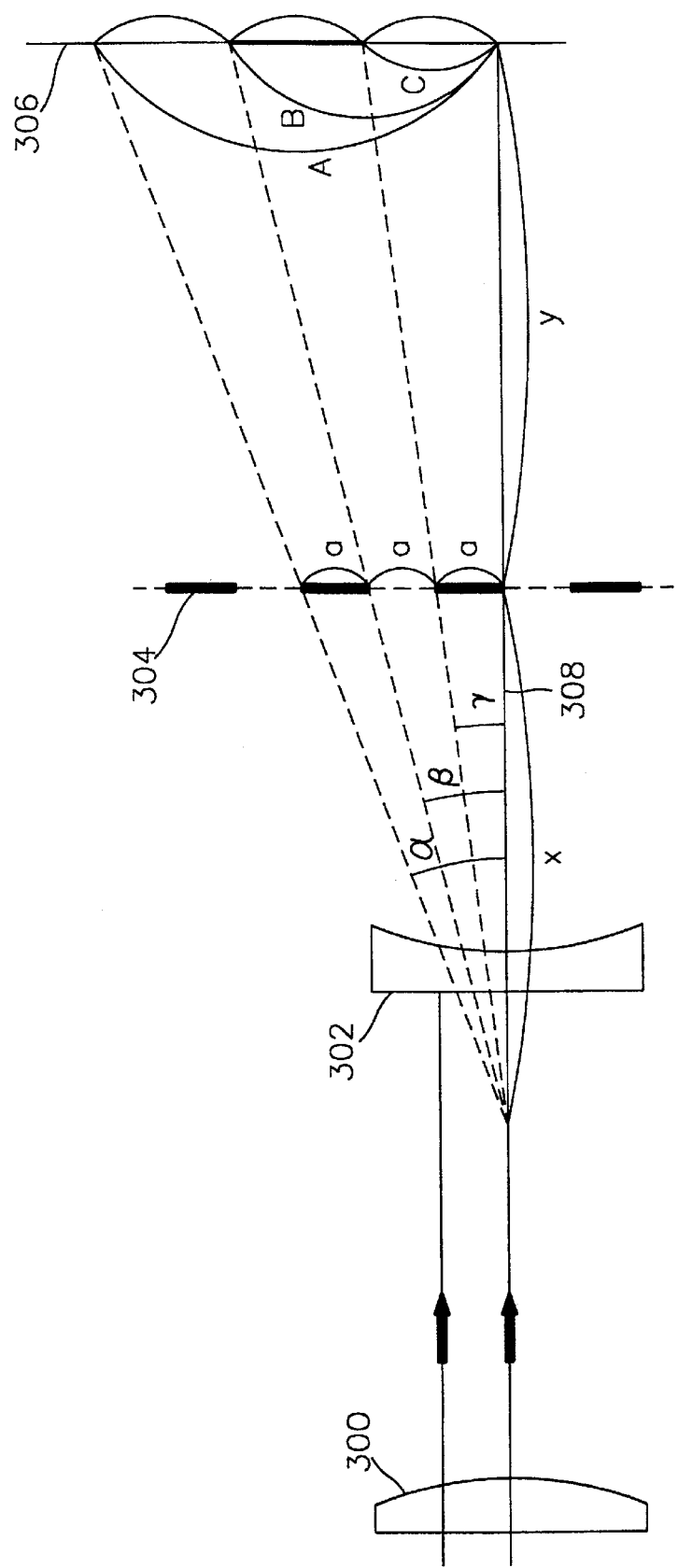
FIG. 3 illustrates the process of determining the grating period by adjusting the position of an amplitude mask.

FIG. 3 illustrates the process of determining the grating period by adjusting the position of an amplitude mask. Referring to FIG. 3, the laser light passed through a cylindrical lens 300 is dispersed by a concave lens 302 and masked by an amplitude mask 304 to then be selectively irradiated onto an optical fiber 306. Here, for the convenience of explanation, it is assumed that the distance between the focus of the concave lens 302 and the amplitude mask 304 is x and the distance between the amplitude mask 304 and the optical fiber 306 is y. Also, it is assumed that a half-period of the amplitude mask 304 is a, angles of the laser light reaching the optical fiber 306 from the focus of the concave lens 302 via the amplitude mask 304 with respect to horizontal laser light 308 are y, β and α, and the lengths of the laser light periodically irradiated onto the optical fiber 306 are C, B and A, respectively. Then, the following equations are satisfied.

$$\tan \alpha = \frac{3a}{x} = \frac{A}{x+y} \qquad (2)$$

$$\tan \beta = \frac{2a}{x} = \frac{B}{x+y}$$

$$\tan \gamma = \frac{a}{x} = \frac{C}{x+y}$$

Assuming that A is the period of the grating written on the optical fiber 306, $\Lambda$ is obtained using equation (2) to be expressed as:

$$\Lambda = \frac{2a(x+y)}{x} = \frac{\Lambda_0(x+y)}{x} \qquad (3)$$

where $\Lambda_0$ is the periodicity of the amplitude mask 304 and equals 2a.

In other words, when the distance between the concave lens 302 and the optical fiber 306 is adjusted, the period of a long-period fiber grating written on the optical fiber 306 is adjusted in accordance with the position of the amplitude mask 304.

Figure 4A:
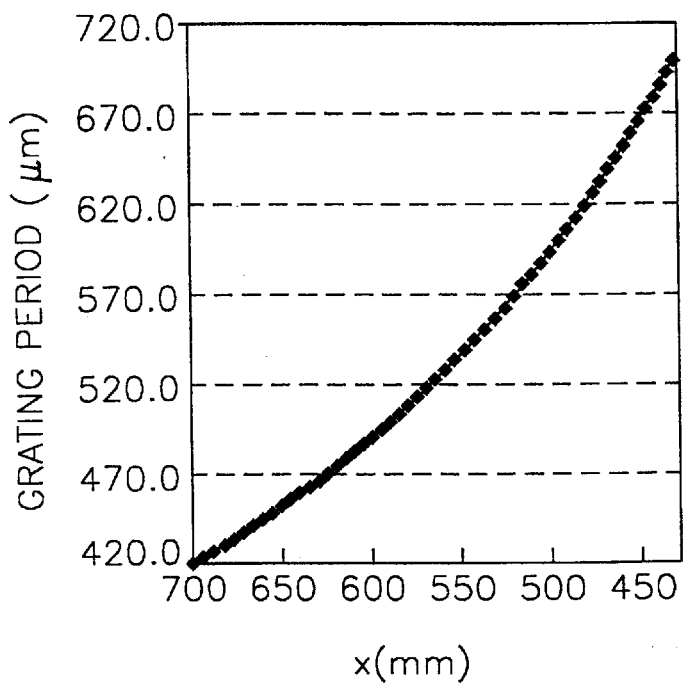
FIGS. 4A and 4B illustrate the grating periods depending on a change in x values when x+y=700 mm and 430 mm, respectively.

FIG. 4A illustrates the grating period depending on a change in x values when x+y=700 mm. Table 1 lists the values of the periods depending on x values. Here, the periodicity of the amplitude mask 304 is 420 μm.

TABLE 1

| x (mm) | Grating period (μm) |
|---|---|
| 700 | 420.0 |
| 690 | 426.1 |
| 680 | 432.4 |
| 670 | 438.8 |
| 660 | 445.5 |
| 650 | 452.3 |
| 640 | 459.4 |
| 630 | 466.7 |
| 620 | 474.2 |
| 610 | 482.0 |
| 600 | 490.0 |
| 590 | 498.3 |
| 580 | 506.9 |
| 570 | 515.8 |
| 560 | 525.0 |
| 550 | 534.5 |
| 540 | 544.4 |
| 530 | 554.7 |
| 520 | 565.4 |
| 510 | 576.5 |
| 500 | 588.0 |
| 490 | 600.0 |
| 480 | 612.5 |
| 470 | 625.5 |
| 460 | 631.1 |
| 450 | 653.3 |

Figure 4B:
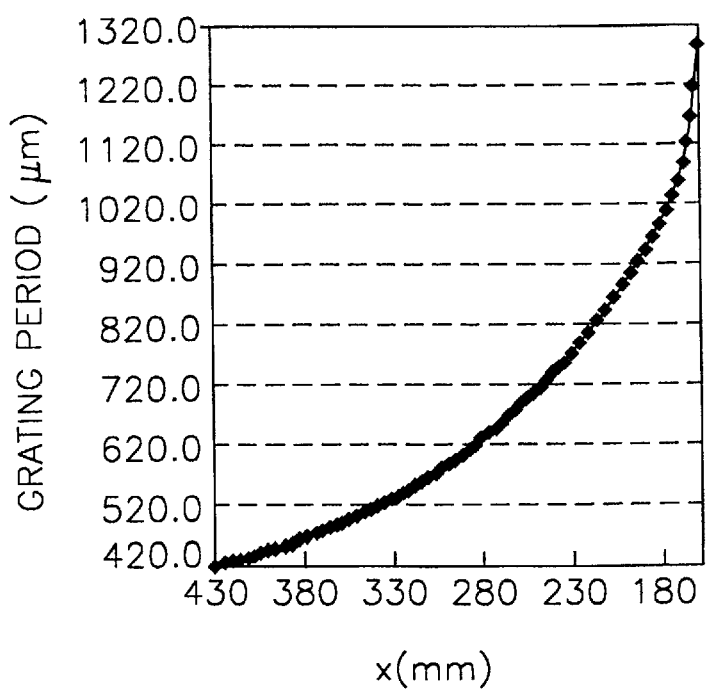
Figure 5A:
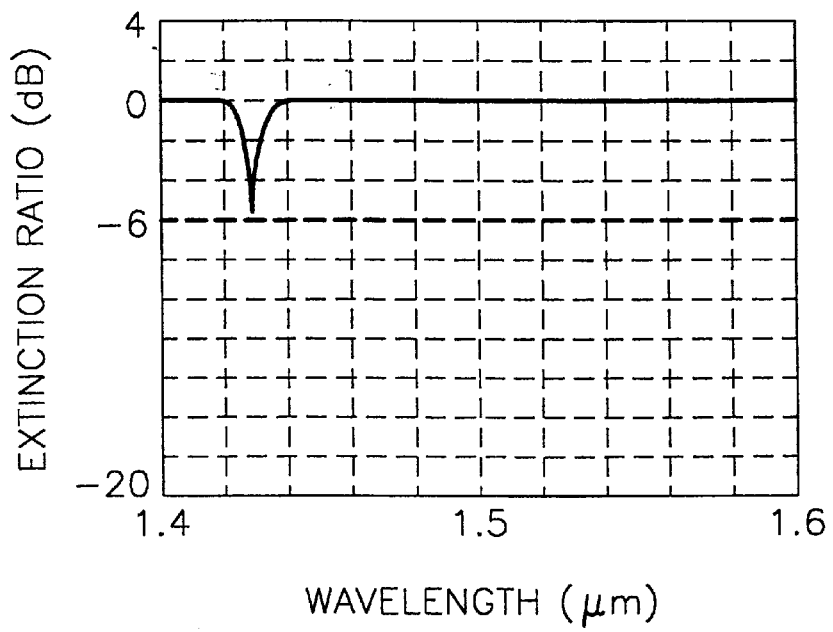
FIGS. 5A through 5D illustrate spectrums of a long-period grating filter having a predetermined extinction ratio at various wavelengths with respect to a change in x values, when x+y=430 mm.
Figure 5B:
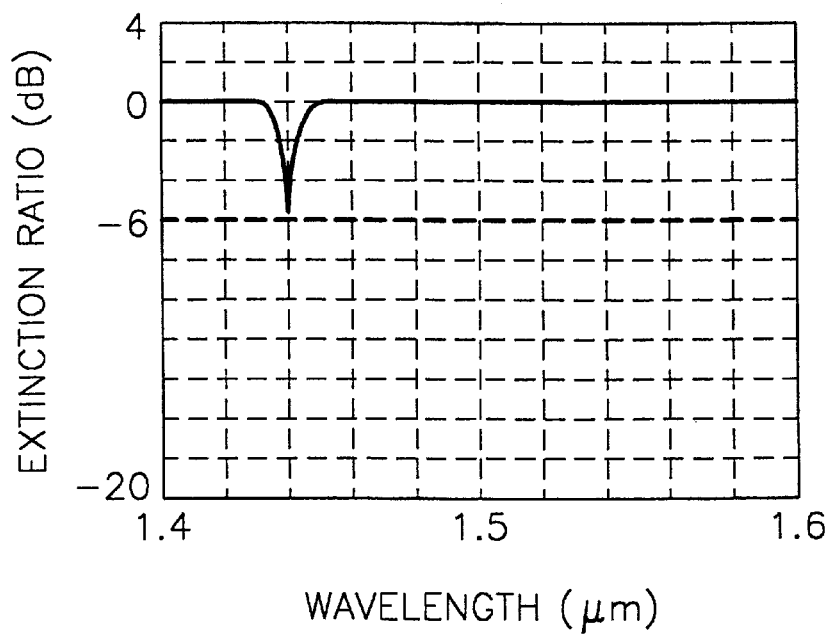
Figure 5C:
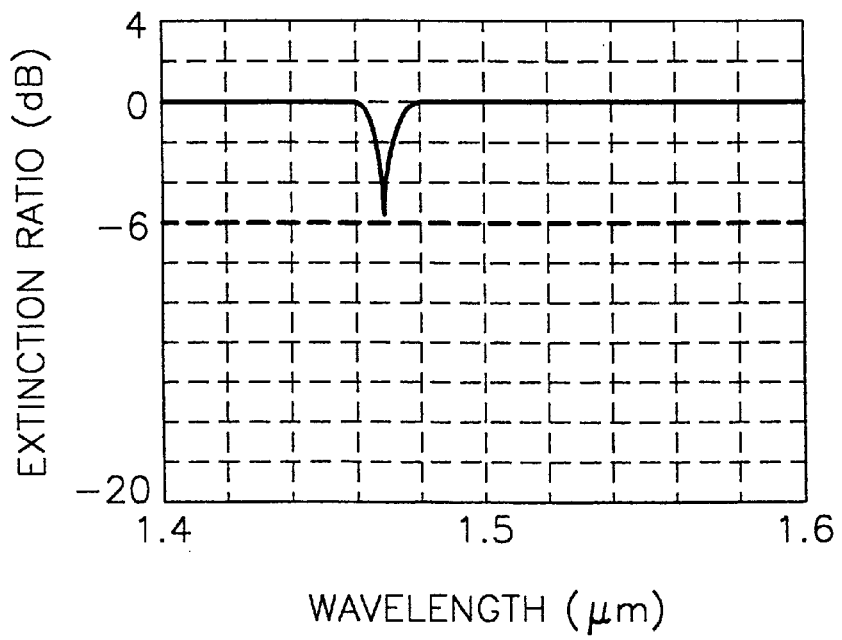
Figure 5D:
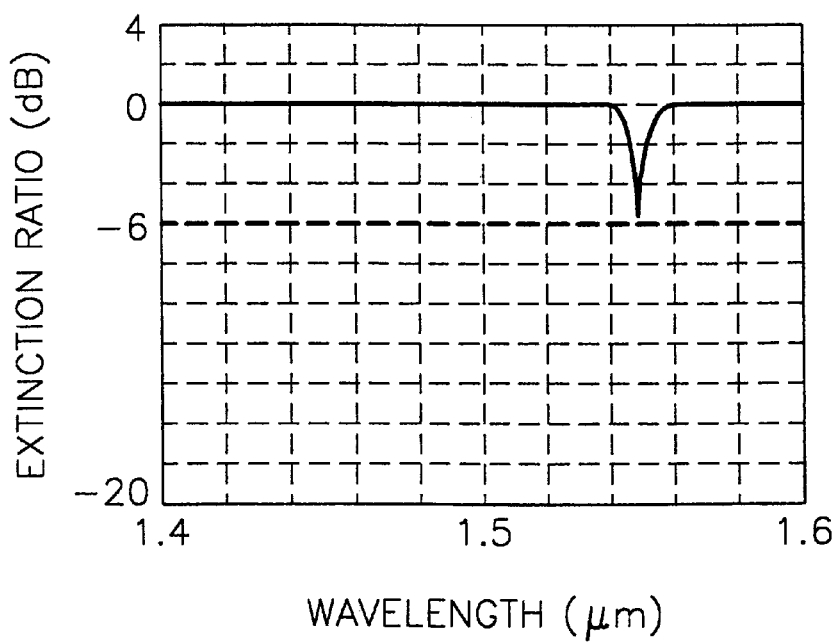

FIG. 4B illustrates the grating period depending on a change in x values when x+y=430 mm. Table 2 lists the values of the periods depending on x values. Here, the periodicity of the amplitude mask 304 is 420 μm.

TABLE 2

| x (mm) | Grating period (μm) |
|---|---|
| 430 | 420.0 |
| 420 | 430.0 |
| 410 | 440.5 |
| 400 | 451.5 |

TABLE 2-continued

| x (mm) | Grating period (μm) |
|---|---|
| 390 | 463.1 |
| 380 | 475.3 |
| 370 | 488.1 |
| 360 | 501.7 |
| 350 | 516.0 |
| 340 | 531.2 |
| 330 | 547.3 |
| 320 | 564.4 |
| 310 | 582.6 |
| 300 | 602.0 |
| 290 | 622.8 |
| 280 | 645.0 |
| 270 | 668.9 |
| 260 | 694.6 |
| 250 | 722.4 |
| 240 | 752.5 |
| 230 | 785.2 |
| 220 | 820.9 |
| 210 | 860.0 |
| 200 | 903.0 |
| 190 | 950.5 |
| 180 | 1003.3 |

As the distance between the focus of a concave lens and the optical fiber, that is, x+y, increases, a variation in periods is lesser than to the variation in x values, which is advantageous for accurately adjusting the periods. In other words, in the case of designing a desired spectrum, the band width is adjusted by the width of a slit and x corresponding to the distance between the concave lens 302 and the amplitude mask 304 and y corresponding to the distance between the amplitude mask 304 and the optical fiber 306 are adjusted, thereby adjusting the coupling peak wavelength and coupling peak.

FIGS. 5A through 5D illustrate spectra of a long-period grating filter having an extinction ratio of 5.4 dB at various wavelengths with respect to a change in x values, when x+y=430 mm, that is, coupling peaks in the case of placing the amplitude mask at location where x is 400 mm, 395 mm, 385 mm and 355 mm. As shown in the drawings, when $355 \leq x \leq 400$ mm, the coupling peak wavelengths ranging from 1300 nm to 1500 nm can be serially obtained.

Therefore, in order to manufacture a long-period fiber grating having a desired output spectrum, the band width may be adjusted as determined by the slit size, and the distance x between a concave lens and an amplitude mask and a distance y between the amplitude mask and an optical fiber are adjusted.

It is sometimes desirable to manufacture a long-period fiber grating having more than one band, that is, a multiple band long-period fiber grating. The apparatus and method of the present invention can be modified to produce a multiple band long-period fiber grating. The specific case of a two-band long-period fiber grating is described in detail below, and it will be apparent to those of skill in the art that the apparatus could be further modified for making a long-period fiber grating with three or more bands.

Figure 6:
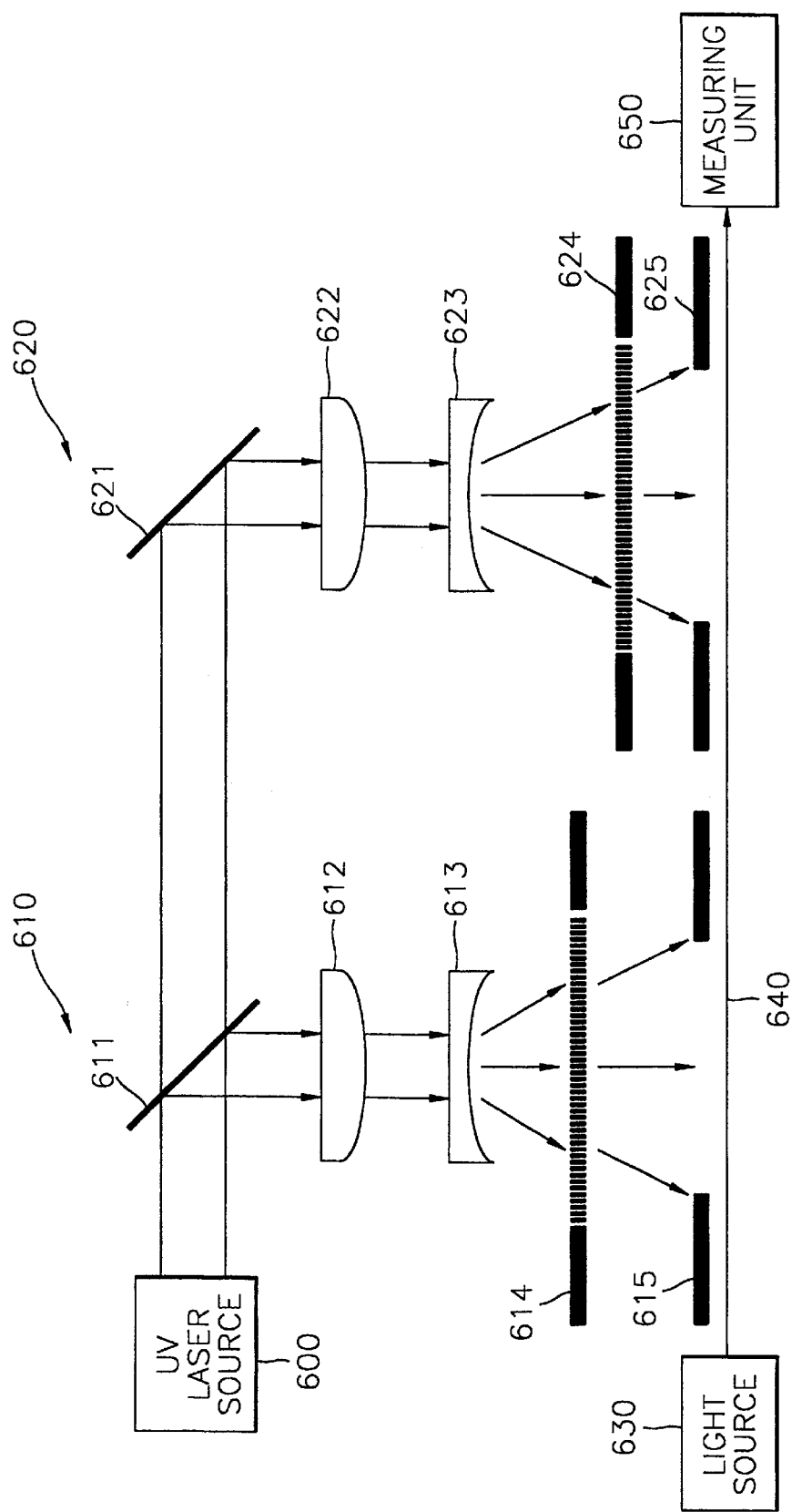
FIG. 6 is a schematic diagram of an apparatus for manufacturing two-band long-period fiber gratings using the long-period fiber gratings according to the present invention.

FIG. 6 is a schematic diagram of an apparatus for manufacturing two-band long-period fiber gratings using the long-period fiber gratings according to the present invention. The two-band long-period fiber grating shown in FIG. 6 includes a UV laser source 600, a first long-period fiber grating manufacturing unit 610, a second long-period fiber grating manufacturing unit 620, a light source 630, an optical fiber 640, a measuring unit 650 and a controller (not shown).

The first long-period fiber grating manufacturing unit 610 includes a splitter 611, a first cylindrical lens 612, a first dispersing portion 613, a first amplitude mask 614 and a first slit 615. The second long-period fiber grating manufacturing unit 620 includes a mirror 621, a second cylindrical lens 622, a second dispersing portion 623, a second amplitude mask 624 and a second slit 625.

In the case of an apparatus for a three-band optical fiber grating, a second splitter 611 would be used instead of mirror 621, and an additional long-period fiber grating manufacturing unit 620 would be positioned to the right of the second long-period manufacturing unit. Yet additional long-period fiber grating manufacturing units could be added for manufacturing additional bands of a multiple band fiber grating. In the multiple band optical fiber grating, the splitters used would have different light splitting ratios, to achieve the appropriate distribution of light to the separate long-period fiber grating manufacturing units.

Now, the process of manufacturing the two-band long-period fiber grating using the aforementioned configuration will be described. The first and second long-period fiber grating manufacturing units 610 and 620 form long-period gratings having first and second periods on the optical fiber 640 substantially at the same time.

In detail, first, the splitter 610 splits the UV laser light generated in the UV laser source 600 in a ratio of 1:1 by partially reflects the laser light at a right angle (90°). Thus, a portion of the light is reflected and the non-reflected portion is allowed to travel straight. The first cylindrical lens 612 allows the incident UV laser light whose traveling path is reflected by the splitter 610 to be focused through the axis where the beam size becomes large. Here, the focal point lands on the optical fiber 640. The first dispersing portion 613 disperses the light passed through the first cylindrical lens 612 to increase the beam size. The light passed through the first dispersing portion 613 is selectively allowed to pass by the first amplitude mask 614. The width of the first slit 615 is determined by the bandwidth of a desired spectrum of the long-period fiber grating. When light passed through the first slit 615 is irradiated into the optical fiber 640, the measuring unit 650 measures the coupling peaks at various wavelengths of the light generated in the light source 630 and passed through the optical fiber 640. The controller (not shown) adjusts the position of the first amplitude mask 614 so that coupling occurs at a desired wavelength of the long-period fiber grating, thereby adjusting the period of the long-period fiber grating.

The UV laser light passed through the splitter 610 is reflected by the mirror 621 at a right angle (90°) so that its traveling path is changed. The second cylindrical lens 622 allows the incident UV laser light whose traveling path is changed by the mirror 621 to be focused through the axis where the beam size becomes large. Here, the focal point lands on the optical fiber 640. The second dispersing portion 623 disperses the light passed through the second cylindrical lens 622 to increase the beam size. The second amplitude mask 624 allows the light passed through the second dispersing portion 623 to selectively pass through the same. The width of the second slit 625 is determined by the bandwidth of a desired spectrum of the long-period fiber grating. If the light having passed through the second slit 625 is irradiated into the optical fiber 640, the measuring unit 650 measures the coupling peaks at various wavelengths of the light generated in the light source 630 and passed through the optical fiber 640. The controller (not shown) adjusts the position of the second amplitude mask 624 so that coupling occurs at a desired wavelength of the long-period fiber grating, thereby adjusting the period of the long-period fiber grating.

Here, the optical fiber 640 is sensitive to UV laser light and is obtained by loading hydrogen (H$_2$) into a germanium (Ge)-doped optical fiber. Hydrogen loading is done at a temperature of 80 to 90° C. at a pressure of up to 100 atmospheres. The hydrogen-loaded fiber is maintained at room temperature. As time passes, hydrogen molecules diffused throughout the optical fiber slowly escape outside the cladding. Since hydrogen molecules escape, a difference in refractive indices between the core and the cladding is generated. Thus, depending on the time the optical fiber is kept at room temperature, coupling conditions change.

Figure 7A:
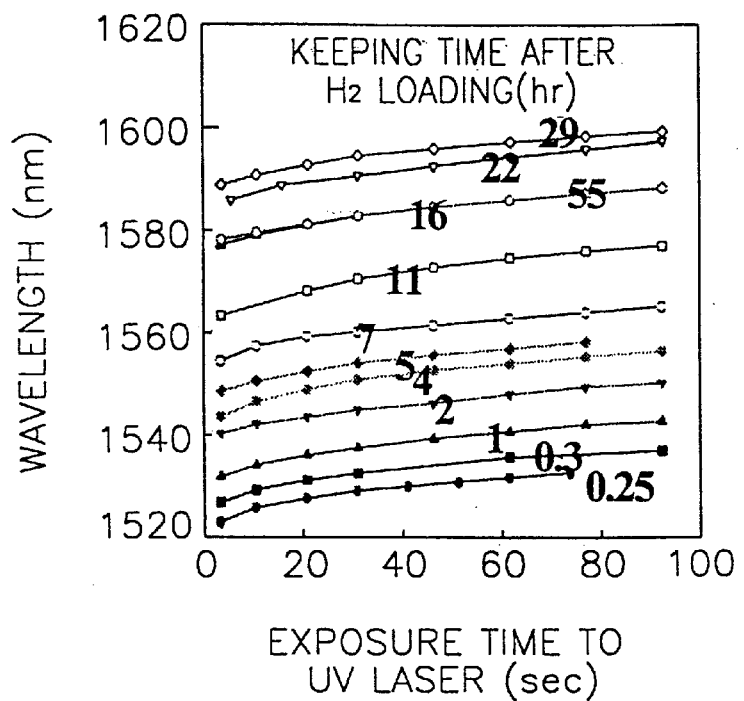
Figure 7B:
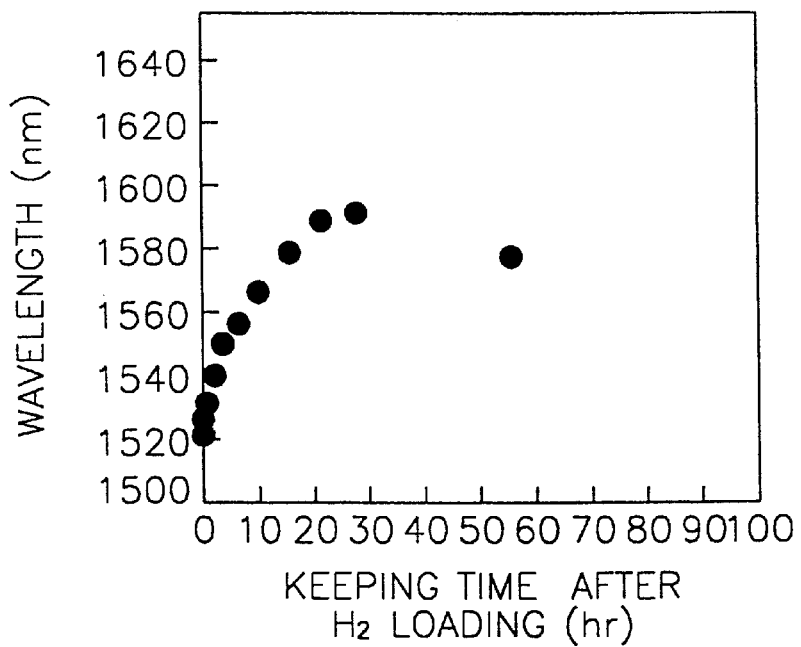

FIG. 7A illustrates a change in wavelengths where coupling occurs over the UV exposure time, and FIG. 7B illustrates a change in wavelengths where coupling starts over the time kept at room temperature after H$_2$ loading. As shown in FIGS. 7A and 7B, as the time kept at room temperature gets longer, the coupled wavelengths are shifted toward longer wavelengths, and are then shifted toward shorter wavelengths in about 30 hours.

Figure 8:
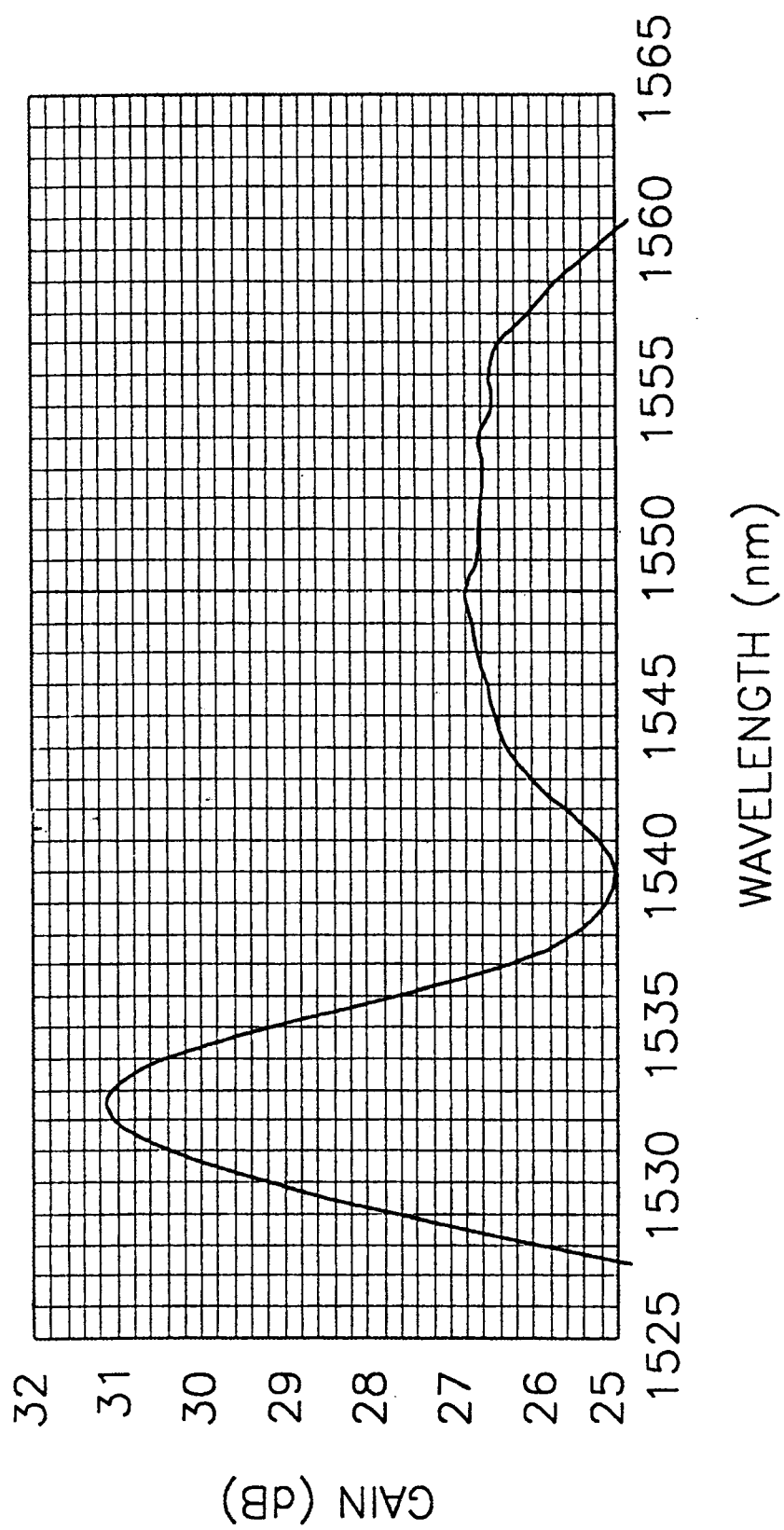
FIG. 8 illustrates the gain characteristics of an optical fiber amplifier depending on wavelengths.

When the long-period fiber grating is manufactured by loading hydrogen into the optical fiber, since the spectrum measured by the measuring apparatus such as an optical spectrum analyzer is not stabilized, compensation must be made for obtaining an accurate spectrum for a final stabilized product. In particular, if an optical fiber amplifier has gain peaks at 1530 nm and 1550 nm, as shown in FIG. 8, the gains of both bands must be simultaneously flattened in order to obtain a gain-flattened optical fiber amplifier.

In the present invention, the gains can be simultaneously adjusted at both bands by adjusting the position of two amplitude masks 614 and 624. As the amplitude masks 614 and 624, the amplitude mask shown in FIG. 2 is suitably used. Also, position adjustment of the amplitude masks 614 and 624 and period adjustment of the long-period fiber grating are performed in the above-described manner.

According to the present invention, the bandwidth of a long-period fiber grating can be adjusted by adjusting the size of a laser beam irradiated into an optical fiber. Also, amplitude masks can be easily manufactured at low cost and damage threshold power thereof is high. Also, since grating periods of the optical fiber are accurately adjusted, a filter having desired characteristics can be simply manufactured using a single mask.

Further, if two bands are simultaneously manufactured according to the present invention, since the possibility of wavelength shift due to hydrogen diffusion is removed, the filter design is simplified and the time necessary for manufacturing the filter is reduced. The light used for long-period fiber gratings has a power of output of about 120 mJ. In the present invention, since excimer laser light of high power (600 mJ) split in a ratio of 1:1 using a splitter is used, the long-period fiber grating according to the present invention can operate in a more stable manner with respect to the excimer laser light.

What is claimed is:

1. An apparatus for manufacturing a long-period fiber grating from an optical fiber, comprising:
    a UV laser light source for generating UV laser light;
    a cylindrical lens for focusing the UV laser light onto the optical fiber;
    a dispersing unit between the cylindrical lens and the fiber, said dispersing unit having a focus, for dispersing the UV light exiting the cylindrical lens;
    an amplitude mask having a plurality of transmission regions and non-transmission regions spaced at a transmission periodicity, said amplitude mask positioned between the dispersing unit and the optical fiber at a first distance from the optical fiber; and
    a slit located between the amplitude mask and the optical fiber, said slit having a slit width along the optical fiber.

2. The apparatus of claim 1, further comprising:
    said dispersing unit being a concave lens.

3. The apparatus of claim 2, further comprising:
    said concave lens being a plano-concave lens.

4. The apparatus of claim 1, said amplitude mask comprising a thin metal substrate.

5. The apparatus of claim 4, the transmission region of said amplitude mask being formed by CO$_2$ laser or chemical etching.

6. The apparatus of claim 1, further comprising a controller connected to said amplitude mask for controlling said first distance.

7. The apparatus of claim 1, further comprising:
    a light source on one end of the optical fiber and a measuring unit on the other end of the optical fiber, for measuring a coupling peak of the long-period fiber grating.

8. The apparatus of claim 7, further comprising:
    a controller connected to the amplitude mask and to the measuring unit, for controlling said first distance as a function of the measured coupling peak.

9. The apparatus of claim 1, further comprising:
    a mirror between the UV laser light source and the cylindrical lens, for reflecting the UV laser light into the cylindrical lens.

10. The apparatus of claim 1, further comprising:
    the value of said first distance being given by the formula:

$$\Lambda = \frac{\Lambda_0 (x+y)}{x}$$

where y is said first distance, x is the distance from the focus of the first dispersing unit to the optical fiber, $\Lambda_0$ is the transmission periodicity of the amplitude mask, and $\Lambda$ is the periodicity of the fiber grating.

11. An apparatus for manufacturing a multiple band long-period optical fiber grating, comprising:
    a UV laser light source for generating UV laser light;
    a beam splitter for splitting the laser light into a first portion which is reflected and a second portion which is not reflected;
    a first cylindrical lens for focusing the first portion of the UV laser light onto a first region of the optical fiber;
    a first dispersing unit between the first cylindrical lens and the optical fiber, said first dispersing unit having a focus, for dispersing the UV light exiting the first cylindrical lens;
    a first amplitude mask having a plurality of transmission regions and non-transmission region spaced at a first transmission periodicity, said first amplitude mask positioned between the first dispersing unit and the optical fiber at a first distance from the optical fiber;
    a first slit located between the first amplitude mask and the optical fiber, said slit having a first slit width along the optical fiber;
    a mirror for reflecting the second portion of the UV laser light;
    a second cylindrical lens receiving the light reflected by the mirror, for focusing the reflected second portion of the UV laser light onto the optical fiber in a second region adjacent to said first region;
    a second dispersing unit between the second cylindrical lens and the optical fiber, said second dispersing unit having a focus, for dispersing the UV light exiting the second cylindrical lens;

a second amplitude mask having a plurality of transmission regions and non-transmission region spaced at a second transmission periodicity, said second amplitude mask positioned between the second dispersing unit and the optical fiber at a second distance from the optical fiber; and a second slit located between the second amplitude mask and the optical fiber, said slit having a second slit width along the optical fiber.

12. The apparatus of claim 11, further comprising:
said first transmission periodicity being equal to said second transmission periodicity.

13. The apparatus of claim 11, further comprising:
said first and second dispersing units each being concave lenses.

14. The apparatus of claim 11, further comprising:
said first and second amplitude masks each comprising a thin metal substrate.

15. The apparatus of claim 11, further comprising:
a controller attached to said first and second amplitude masks for controlling said first and second distances.

16. The apparatus of claim 11, further comprising:
a light source on one end of the optical fiber and a measuring unit on the other end of the the optical fiber, for measuring coupling peaks of the long-period optical grating.

17. The apparatus of claim 16, further comprising:
a controller connected to said first and second amplitude masks and to the measuring unit, for controlling said first and second distances as a function of the measured coupling peaks.

18. A method of manufacturing a long-period fiber grating, comprising the steps of:
directing a UV laser light beam through a cylindrical lens oriented with the focal point on an optical fiber, and then passing the light from the cylindrical lens through a dispersing unit having a focus, for increasing the beam size;

passing the light from the dispersing unit through an amplitude mask having a transmission periodicity and oriented at a distance from the optical fiber to irradiate a region of the optical fiber around the focal point of the first cylindrical lens; and passing the light from a first amplitude mask through a fu-st slit having a first slit width to irradiate a region of the optical fiber.

19. The method of claim 18, said step of directing a UV laser light beam comprising reflecting the laser light beam using a mirror.

20. The method of claim 18, further comprising:
controlling said distance of the amplitude mask from the fiber using a controller.

21. The method of claim 20, further comprising:
measuring the coupling peaks of light passed through the fiber from a light source at one end to a measuring unit at the other end during the manufacture of the long-period grating; and
adjusting said first distance using the controller so that a measured coupling peak occurs at a desired wavelength.

22. The method of claim 18, further comprising:
using a hydrogen-loaded germanium-doped optical fiber as the optical fiber.

23. The method of claim 18, further comprising:
setting the first distance to the value determined using the formula:

$$\Lambda = \frac{\Lambda_0(x+y)}{x}$$

where y is the first distance, x is the distance from the focus of the first dispersing unit to the optical fiber, $\Lambda_0$ is the transmission periodicity of the first amplitude mask, and $\Lambda_0$ is the periodicity of the first band of the fiber grating.

24. A method of manufacturing a multiple band long-period fiber grating, comprising the steps of:
splitting a UV laser beam into two portions in approximately a 1:1 ratio;

directing one portion of the UV laser light through a first cylindrical lens oriented with the focal point on an optical fiber, and then passing the light from the cylindrical lens through a first dispersing unit having a focus, for increasing the beam size;

passing the light from the first dispersing unit through a first amplitude mask having a first periodicity and oriented at a first distance above the optical fiber;

passing the light from a first amplitude mask through a first slit having a first slit width along the length of the optical fiber to irradiate a region of the optical fiber around the focal point of the first cylindrical lens;

directing the second portion of the UV laser light through a second cylindrical lens oriented with the focal point on a region of the optical fiber adjacent to the focal point of the first cylindrical lens, and then passing the light from the second cylindrical lens through a second dispersing unit having a focus, for increasing the beam size; and passing the light from the second dispersing unit through a second amplitude mask having a second periodicity and oriented at a second distance above the optical fiber and through a second slit having a second slit width, to irradiate a region of the optical fiber around the focal point of the second cylindrical lens.

25. The method of claim 24, further comprising: controlling the first and second distances using a controller.

26. The method of claim 25, further comprising:
measuring the coupling peaks of light passed through the fiber from a light source at one end to a measuring unit at the other end during the manufacturing of the two band long-period fiber grating; and
adjusting the position of the first amplitude mask using the controller so that a measured coupling peak occurs at a desired wavelength.

27. The method of claim 24, said step of directing the second portion of the light comprising reflecting the second portion using a mirror.

28. The method of claim 27, further comprising:
setting the first distance to the value determined using the formula:

$$\Lambda = \frac{\Lambda_0(x+y)}{x}$$

where y is the first distance, x is the distance from the focus of the first dispersing unit to the optical fiber, $\Lambda_0$ is the transmission periodicity of the first amplitude mask, and $\Lambda$ is the periodicity of the first band of the fiber grating.

29. The method of claim 24, further comprising:
using a hydrogen-loaded germanium doped optical fiber as the optical fiber.

30. The method of claim 24, further comprising:
the first period of the first amplitude mask being equal to the second period of the second amplitude mask.

31. The method of claim 24, further comprising:
adjusting the first and second slit widths to determine the first and second bandwidths of the two-band fiber grating.

* * * * *